(12) United States Patent
Chiarini et al.

(10) Patent No.: US 10,773,903 B2
(45) Date of Patent: Sep. 15, 2020

(54) SUPPORT DEVICE FOR A PNEUMATIC PREHENSILE MEMBER

(71) Applicant: CAMOZZI AUTOMATION S.P.A., Brescia (IT)

(72) Inventors: Pierluigi Chiarini, Brescia (IT); Fabio Levi, Brescia (IT)

(73) Assignee: CAMOZZI AUTOMATION S.P.A., Brescia (IT)

(*) Notice: Subject to any disclaimer, the term of this patent is extended or adjusted under 35 U.S.C. 154(b) by 0 days.

(21) Appl. No.: 16/340,540

(22) PCT Filed: Nov. 11, 2017

(86) PCT No.: PCT/IB2017/057028
§ 371 (c)(1),
(2) Date: Apr. 9, 2019

(87) PCT Pub. No.: WO2018/087700
PCT Pub. Date: May 17, 2018

(65) Prior Publication Data
US 2020/0048013 A1 Feb. 13, 2020

(30) Foreign Application Priority Data
Nov. 11, 2016 (IT) .......................... 102016000114172

(51) Int. Cl.
*B65G 47/91* (2006.01)
*B66C 1/02* (2006.01)
*B25J 15/06* (2006.01)

(52) U.S. Cl.
CPC .......... *B65G 47/91* (2013.01); *B25J 15/0616* (2013.01); *B66C 1/02* (2013.01)

(58) Field of Classification Search
CPC ......... B65G 47/91; B66C 1/02; B25J 15/0616
(Continued)

(56) References Cited

U.S. PATENT DOCUMENTS 5,193,776 A 3/1993 Nagai et al.
5,201,875 A * 4/1993 Tessier ............... G01R 31/2851
294/183

(Continued)

FOREIGN PATENT DOCUMENTS

DE 1204025 B 10/1965
EP 0051175 A1 5/1982
(Continued)

OTHER PUBLICATIONS

International Search Report for PCT/IB2017/057028 dated Jan. 30, 2018.

*Primary Examiner* — Paul T Chin
(74) *Attorney, Agent, or Firm* — Michael Fainberg; Arent Fox LLP

(57) ABSTRACT

A support and vacuum power device for a pneumatic prehensile member, such as a suction cup, comprises a casing and a sleeve protruding from said casing and wherein at least one recess is formed. A movable element is movable in translation in the casing and is provided with a power supply duct. The movable element comprises a stem guided in translation in the sleeve. An anti-rotation insert made in a single body is inserted into the sleeve through the recess and is provided with a through opening slidably engaged by the stem. The through opening is defined by at least one contact surface extended for an effective contact with an engagement portion of the movable element, thus achieving an anti-rotation constraint for the movable element.

14 Claims, 3 Drawing Sheets

(58) Field of Classification Search
USPC .............. 294/183, 185, 187, 192, 193, 194; 901/40
See application file for complete search history.

(56) References Cited

U.S. PATENT DOCUMENTS

| | | | | |
|---|---|---|---|---|
| 6,065,789 | A * | 5/2000 | Nagai | B41F 21/06 294/185 |
| 6,240,628 | B1 * | 6/2001 | Yoshida | H05K 13/0413 29/740 |
| 7,883,132 | B2 * | 2/2011 | Maffeis | B65G 47/91 294/119.1 |
| 8,267,449 | B2 | 9/2012 | Giuseppe | |
| 9,894,819 | B2 * | 2/2018 | Teshima | H05K 13/0408 |
| 10,183,402 | B1 * | 1/2019 | Xiang | B25J 15/0616 |
| 2012/0066913 | A1 | 3/2012 | Alliss et al. | |
| 2013/0108409 | A1 * | 5/2013 | Wu | H01L 21/67742 414/800 |

FOREIGN PATENT DOCUMENTS

| EP | 0876750 A1 | 11/1998 |
|---|---|---|
| JP | 1075094 A | 3/1998 |

\* cited by examiner

SUPPORT DEVICE FOR A PNEUMATIC PREHENSILE MEMBER

CROSS-REFERENCE TO RELATED APPLICATIONS

This application is the U.S. National Stage Application of International Patent Application No. PCT/IB2017/057028, filed on Nov. 10, 2017, which claims priority to Italian Patent Application No. 102016000114172, filed on Nov. 11, 2016, the contents of each of which is incorporated herein by reference in its entirety.

FIELD OF INVENTION

The present invention relates to the field of industrial automation, and in particular the sector of members for gripping and handling parts being machined or other components.

BACKGROUND OF THE INVENTION

In this sector, wide use is made of pneumatically operated prehensile members, for example suction cups, able to adhere to a surface of the part to be picked up due to the vacuum created by a suction system, duly connected with the suction cups.

SUMMARY OF THE INVENTION

The object of this invention is a device for the support of a pneumatically operated prehensile member, for example a suction cup, able to support the prehensile member and transmit the vacuum to it, and to be in turn connected to a support frame connected to the suction system.

Said support devices are typically provided with a stem, at the end of which is connected the suction cup, able to translate with respect to a main body, intended for rigid connection with the support frame. The translation of the stem is essential for absorbing the shock due to the engagement of the suction cup on the part to be picked up.

Moreover, such devices are typically provided with an anti-rotation mechanism, able to prevent the rotation of the stem with respect to the main body. In fact, because of inaccuracies in gripping a piece or due to the action of the weight of the piece during handling, the piece itself manifests a tendency to rotate that, if not prevented, could lead to the detachment of the suction cup from the gripping surface.

There are many examples of embodiments of support devices provided with an anti-rotation mechanism. An example is described in U.S. Pat. No. 8,267,449.

However, the support devices with anti-rotation mechanism known today have a complex structure, which drives up the production costs of the device, and are often unreliable, with continuous breakdowns and consequent need of replacement, especially in the case of moving heavy loads.

The purpose of this invention is to provide a support device for pneumatic prehensile members, such as suction cups, provided with an anti-rotation mechanism that meets the needs of the sector and overcomes the drawbacks referred to with reference to the prior art.

This purpose is achieved by a support device according to claim 1. The dependent claims describe variant embodiments.

BRIEF DESCRIPTION OF DRAWINGS

The features and advantages of the support device according to this invention will be apparent from the following description, given by way of non-limiting example, with reference to the accompanying figures, wherein.

DETAILED DESCRIPTION

Figure 1:
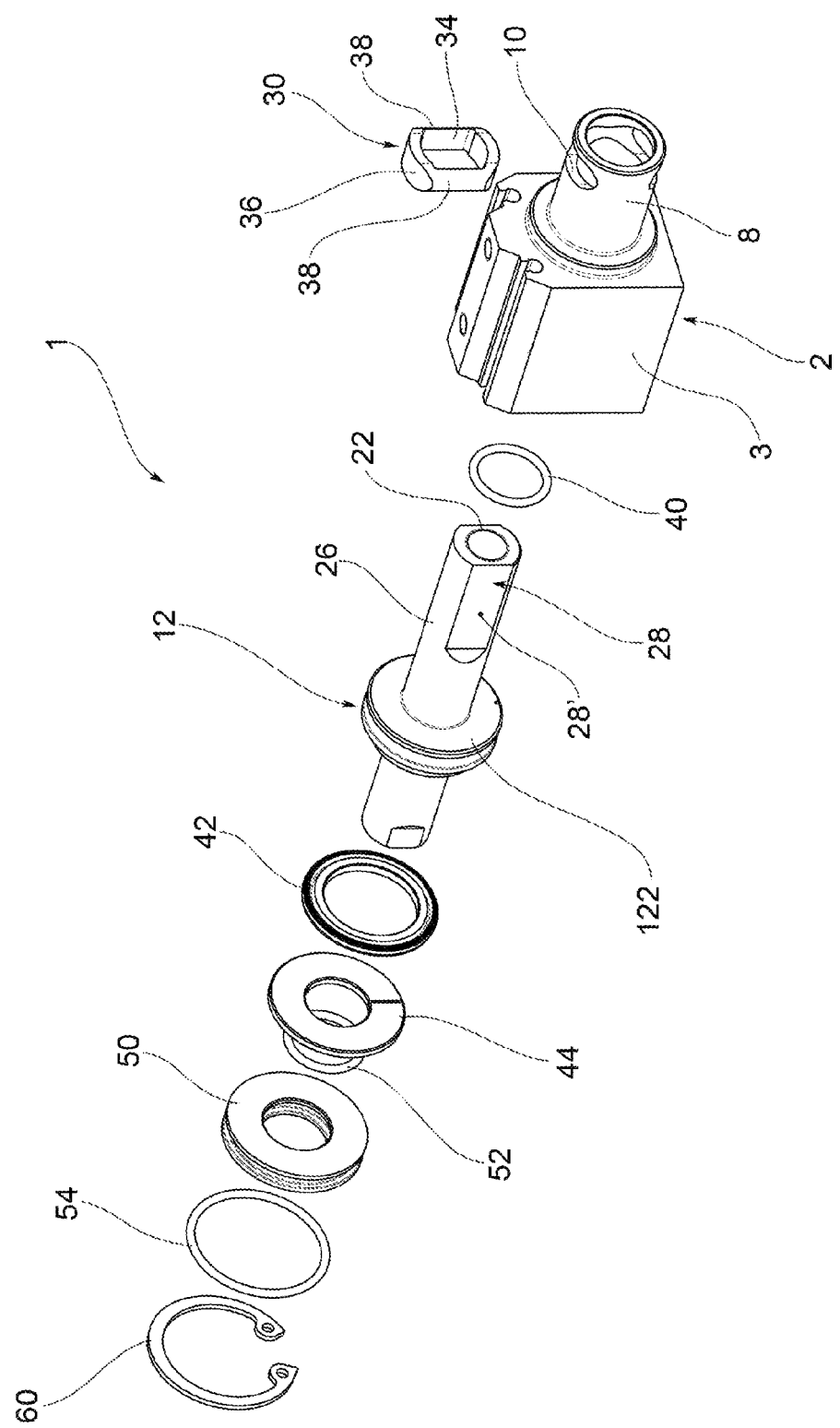
FIG. 1 is an exploded perspective view of the support device according to the present invention.
Figure 2:
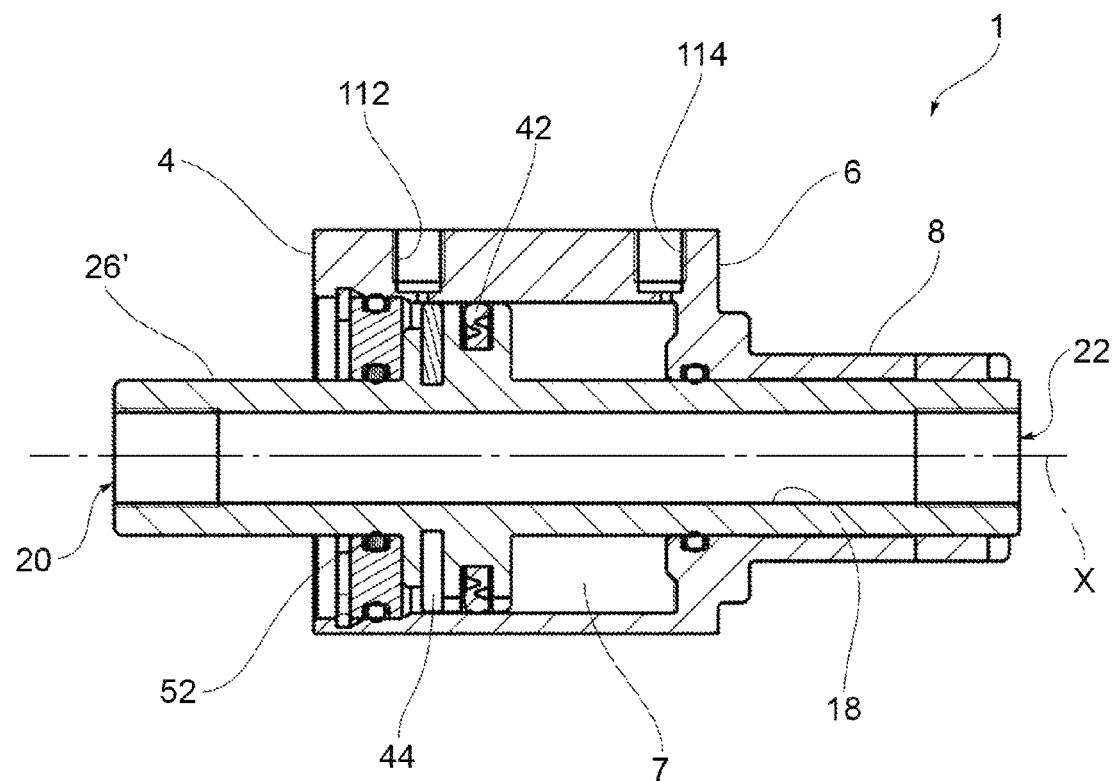
FIG. 2 is an axial section of the device.
Figure 3:
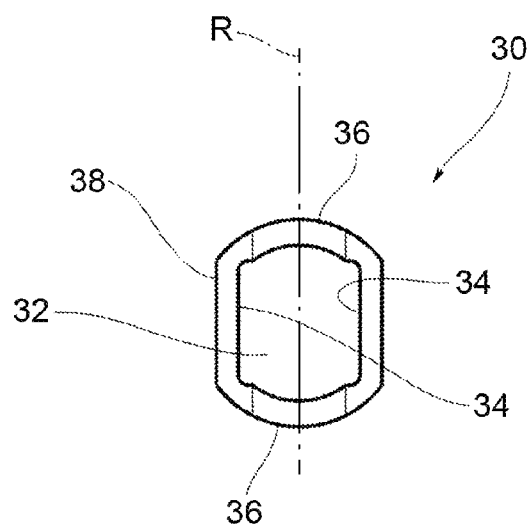
FIG. 3 is a front view of only the anti-rotation insert of the device.
Figure 4:
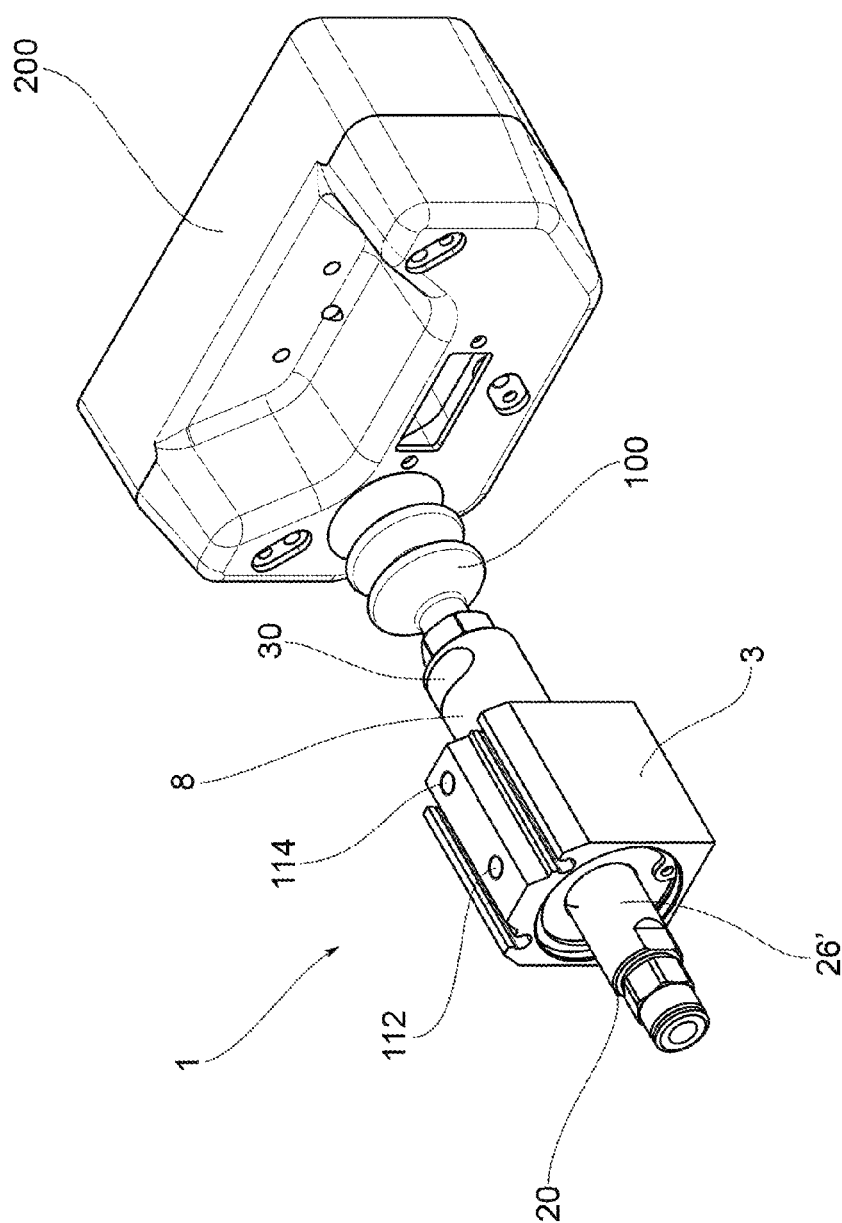
FIG. 4 is a perspective view of the device to which a suction cup is attached.

With reference to the accompanying figures, a support and vacuum power device for a pneumatic prehensile member, such as a suction cup 100, is collectively indicated at 1.

The device 1 is suitable to mechanically support the prehensile member 100 and to supply this with air in depression, so as to activate it for gripping a piece 200, for example a part being machined or to be handled or a component of a machine. Furthermore, the device 1 is suitable to be rigidly connected to a support frame, possibly together with a plurality of further support devices, each carrying a respective prehensile member.

The device 1 comprises a main body 2 intended to be rigidly connected to the support frame.

The main body 2 comprises a casing 3, for example, made of a single piece of metallic material, typically steel, extending axially between a rear surface 4, for example, intended to be coupled with the support frame, and an opposite front surface 6.

The casing 3 is internally hollow, forming a casing chamber 7 passing between the rear surface 4 and the front surface 6.

The main body 2 further comprises a sleeve 8, projecting axially from the front surface 6 of the casing 3; preferably, said sleeve 8 and said casing 3 are made together in a single piece. The sleeve 8 is internally hollow and communicates with the casing chamber 7.

In the sleeve 8, preferably near its front end, a recess 10 is made.

In one embodiment, in the sleeve 8, two diametrically opposite recesses 10 are made.

In one embodiment, each recess 10 is slot-shaped, elongated circumferentially, that is, orthogonally with respect to the main axis of the sleeve 8.

The support device 1 further comprises a movable element 12 extending along a main axis X coincident with the main axis of the sleeve 8 and movable in translation along said main axis X. A power supply duct 18 passes through the movable element 12 extending between a rear mouth 20 intended for the pneumatic connection with a suction device, and a front mouth 22 intended for the pneumatic connection with the prehensile member 100.

The movable element 12 comprises a stem 26 guided in translation in the sleeve 8.

In the lateral wall of the stem 26, an engagement portion 28 is made.

The support device 1 further comprises an anti-rotation insert 30 made in a single body. This anti-rotation insert 30 is inserted in the sleeve 8 through a recess 10 so as to be rigidly connected to the main body 2. In the anti-rotation insert 30 there is provided a through opening 32 slidably engaged by the stem 26, more precisely from the engagement portion 28 of the stem 26.

The through opening 32 is in effect defined by at least one contact surface 34 extended for an effective contact with an engagement portion 28 of the movable element 12, thus achieving an anti-rotation constraint for the movable element 12.

In one embodiment, the through opening 32 is defined by two contact surfaces 34 operating on opposite engagement portions 28.

In one embodiment, the anti-rotation insert 30 engages both of the diametrically opposed recesses 10 with shape-coupling.

In one embodiment, the anti-rotation insert 30 is insertable into and removable from the sleeve 8 through one of the two recesses 10, i.e., radially through the lateral surface of the sleeve 8 and not by the open distal end thereof.

For example, the anti-rotation insert 30 comprises two arched end portions 36 that are coupled with shape-coupling to the recesses 10 of the sleeve 8, and two parallel rectilinear side portions 38 extending between the facing ends of the arched end portions 36. The contact surfaces 34 are made on the inner sides of the rectilinear side portions 38.

In one embodiment, each contact surface 34 has a predetermined extension along the axial direction X and a predetermined extension along a direction R orthogonal to the axial direction X.

For example, each contact surface 34 is rectangular.

In one embodiment, the engagement portion 28 comprises at least one flattened surface 28 of the stem 26.

Preferably, the engagement portion 28 comprises a pair of opposite and parallel flattened surfaces 28', engaged by two parallel contact surfaces 34 of the anti-rotation insert 30.

In one embodiment, each flattened surface 28' extends up to the front mouth 22 of the stem 26.

In one embodiment, the engagement portion 28 of the stem 26 engages with shape-coupling the through opening 32 of the anti-rotation insert 30. In other words, the through opening 32 and the engagement portion 28 have the same cross section.

In one embodiment, the anti-rotation insert 30 is made of self-lubricating plastic material, for example acetyl resin.

In one embodiment, the movable element 12 is pneumatically movable. In this case, the casing 3 forms the jacket of a pneumatic cylinder. The movable element 12 comprises a piston 122 housed slidably in the casing 3.

In one embodiment, a first annular sealing gasket 40 is provided between the stem 26 and the sleeve 8. A second annular sealing gasket 42 is mounted on the piston 122.

In one embodiment, a magnet 44 is also mounted on the piston 122 for detecting the axial position of the movable element 12.

In one embodiment, the rear mouth 20 of the stem 26 is formed at the end of a rear extension 26' of the stem extending rearwardly from the piston 122 and protruding from the rear wall 4 of the casing.

In one embodiment, the rear wall 4 of the casing 3 comprises a cap 50 enclosing the casing chamber 7 on the opposite side with respect to the sleeve 8. The cap 50 is slidably and sealingly engaged by the rear extension 26' of the stem 26 by means of an inner cap seal 52. An outer cap seal 54 is positioned between the cap 50 and the casing 3.

In one embodiment, the cap 50 is axially locked against the piston 122 by a snap ring 60.

In one embodiment, the stem 26 and the piston 122 are made in one piece of a single body.

Preferably, the device 1 further includes pneumatic actuation means for moving in translation the movable element 12 so as to permit the approach and distancing along the main axis X of the prehensile member 100 to the piece to be picked up 200.

For example, the device 1 provides for an alternating translation of the movable element 12; for this purpose, the main body includes a pair of connections 112, 114, one which extends upstream and the other which extends downstream of the piston 122 for the operative connection with a pressurized air supply device.

According to an alternative embodiment, the device 1 includes return means, comprising, for example, a spring, which permanently influence the movable element 12 towards a limit end of stroke limit position, while the other end of stroke limit position is reachable by pneumatic actuation.

In normal use, the pneumatic prehensile member 100, fluidically connected with the front mouth 22 to supply the vacuum, is applied to the support device 1.

The main body 2 is rigidly connected to the support frame, generally together with a plurality of further support devices, each carrying a respective prehensile member.

The movable element 12 is fluidically connected to a suction device through the rear mouth 20, so as to supply the vacuum to the prehensile member through the supply duct 18.

Finally, if necessary, the device 1 is operatively connected to a pressurized air supply device for translational actuation of the movable element 12.

For picking up a piece, the support frame, moved for example by a manipulator or a robot, is brought near to the piece to be picked up.

The device 1 is actuated pneumatically, so that the movable element 12 translates along the main axis X, bringing the prehensile member in contact, with thrust, on the gripping surface of the piece to be picked up.

When the suction cups are in position, the actuation of the suction device allows the vacuum to the suction cups to be supplied through the supply duct 18 of the movable element 12. The suction cups thus adhere to the gripping surface and the piece may be lifted, moved or positioned according to the needs.

In such circumstance, the action of the anti-rotation insert 30 on the engagement portion 28 of the movable element 12 prevents the rotation of said movable element 12 with respect to the main axis X, thus avoiding the generation of torsion actions able to affect the adherence of the suction cups on the gripping surface.

Innovatively, the anti-rotation insert may be easily and quickly assembled to the sleeve as it is sufficient to insert it radially through a recess formed in the side wall of the sleeve. The insert immediately centers itself in the sleeve due to the simultaneous engagement of both of the recesses.

The anti-rotation insert in a single piece has a very large contact surface with the engagement portion of the stem, so that the torsion action is distributed over a large surface, greatly reducing the risk of breakage of the insert.

It is clear that one skilled in the art, in order to meet contingent needs, may make changes to the support device and anti-rotation mechanism described above, all contained within the scope of protection defined by the following claims.

The invention claimed is:

1. Support and vacuum power device for a pneumatic prehensile member, for example a suction cup, comprising:
   a main body for connection to a support frame, said main body comprising a casing and a sleeve projecting from said casing, in said sleeve being formed at least one recess;
   a movable element that extends along a main axis and movable in translation along said main axis, provided with a power supply duct that opens posteriorly through a rear mouth, intended for pneumatic connection with a suction device, and anteriorly through a front mouth, intended for pneumatic connection with the prehensile member, said movable element comprising a stem guided in translation in said sleeve, in the side wall of said stem being formed an engagement portion;

an anti-rotation insert made in a single body inserted into said sleeve through said recess so as to be rigidly connected to the main body, in said anti-rotation insert being formed a through opening slidably engaged by the stem, said through opening being defined by at least one contact surface extended for an effective contact with the engagement portion of the movable element, thus achieving an anti-rotation constraint for said movable element.

2. Device according to claim 1, wherein the through opening of the anti-rotation insert is delimited by two contact surfaces operating on opposite engagement portions.

3. Device according to claim 1, wherein in the sleeve are formed two recesses diametrically opposite, and wherein the anti-rotation insert engages both recesses with shape-coupling.

4. Device according to claim 3, wherein the anti-rotation insert is insertable in and removable from the sleeve through one of the two recesses.

5. Device according to claim 1, wherein the engagement portion comprises at least one flattened surface of the stem.

6. Device according to claim 5, wherein the engagement portion comprises a pair of opposite and parallel flattened surfaces.

7. Device according to claim 5, wherein the flattened surface extends as far as to the front mouth of the stem.

8. Device according to claim 1, wherein the engagement portion of the stem engages with shape-coupling the through opening of the anti-rotation insert.

9. Device according to claim 1, wherein the anti-rotation insert is made of self-lubricating plastic material, for example acetyl resin.

10. Device according to claim 1, wherein, having applied the anti-rotation insert to the main body, each contact surface has a predetermined extension in an axial direction and a predetermined extension in a direction orthogonal to the axial direction.

11. Device according to claim 10, wherein each contact surface is rectangular.

12. Device according to claim 1, wherein each recess has a slot-shaped contour, elongated circumferentially.

13. Device according to claim 1, wherein the movable element is pneumatically movable.

14. Device according to claim 13, wherein the casing forms the jacket of a pneumatic cylinder, and wherein the movable element comprises a piston slidably housed in said casing.

* * * * *

UNITED STATES PATENT AND TRADEMARK OFFICE
CERTIFICATE OF CORRECTION

PATENT NO. : 10,773,903 B2
APPLICATION NO. : 16/340540
DATED : September 15, 2020
INVENTOR(S) : Pierluigi Chiarini Page 1 of 1

It is certified that error appears in the above-identified patent and that said Letters Patent is hereby corrected as shown below:

On the Title Page

Item (22) PCT Filed reads:
"Nov. 11, 2017"

Should read:
--Nov. 10, 2017--

Signed and Sealed this
Twenty-seventh Day of October, 2020

Andrei Iancu
*Director of the United States Patent and Trademark Office*